Jan. 5, 1932.    L. S. ROCKOFF    1,839,441
PARACHUTE
Filed Dec. 12, 1928
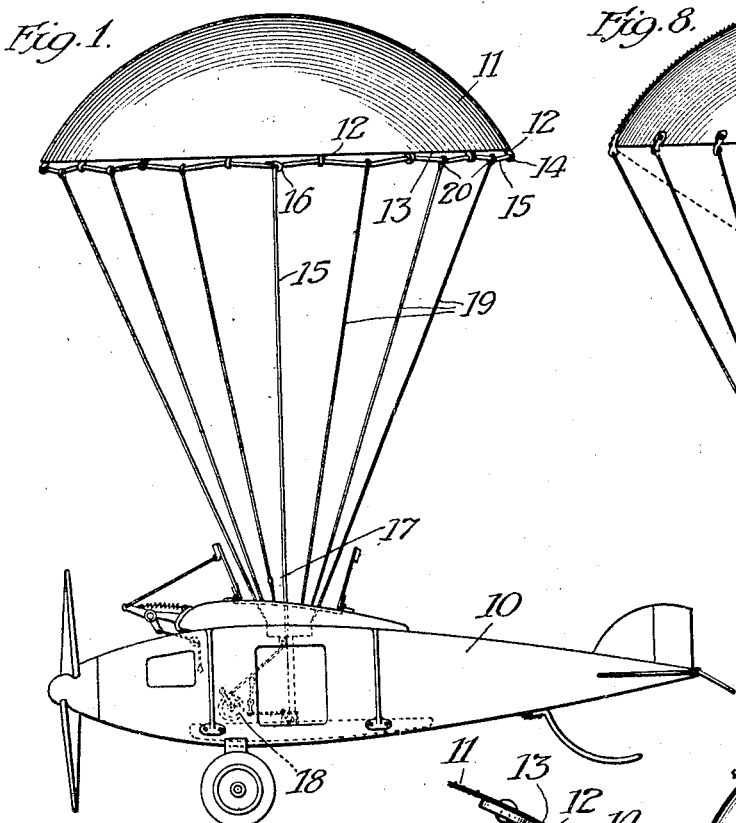
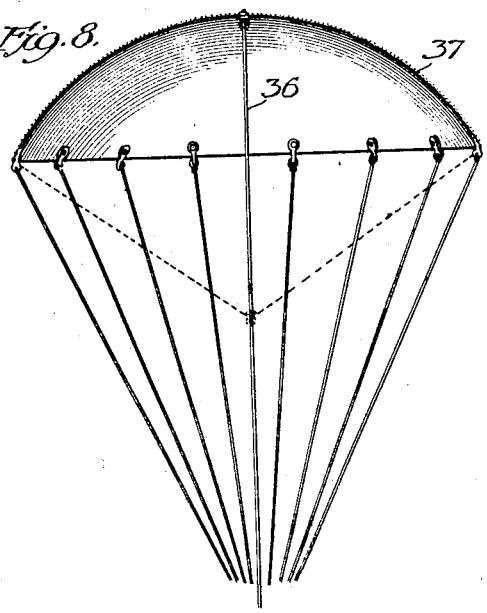
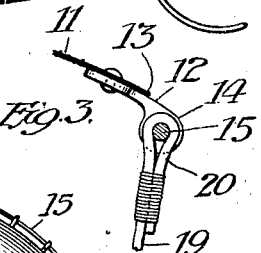
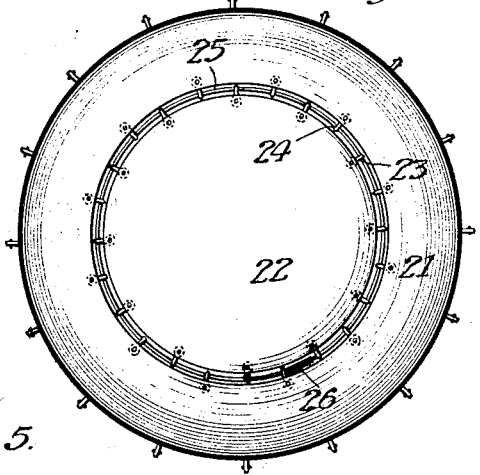
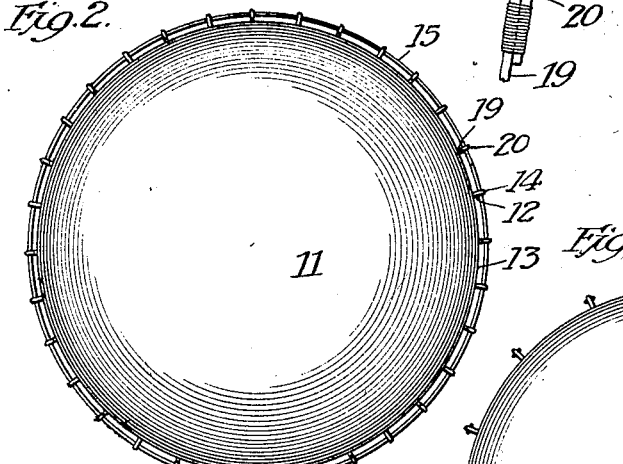
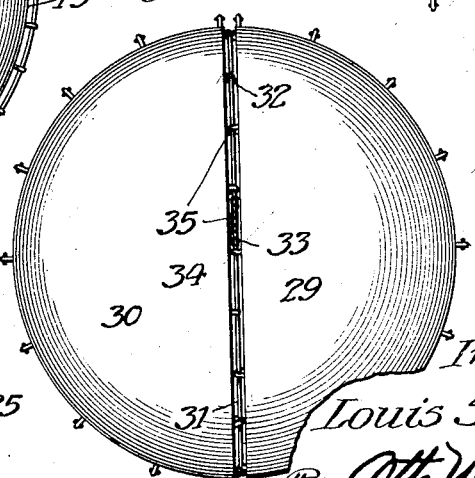
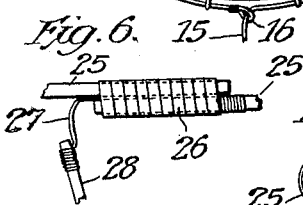
Inventor
Louis S. Rockoff
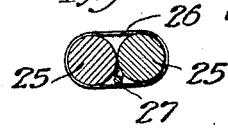

Patented Jan. 5, 1932

1,839,441

UNITED STATES PATENT OFFICE

LOUIS S. ROCKOFF, OF CHICAGO, ILLINOIS

PARACHUTE

Application filed December 12, 1928. Serial No. 325,415.

This invention relates to improvements in parachutes and has as its principal object the provision of means whereby articles such as this may be rendered ineffective for actuation by winds to drag a person or object over the ground after an otherwise safe landing has been accomplished.

The invention has as a further object the accomplishment of the above and other objects through the medium of means under the manual control or will of the person, which means will not interfere with arranging of the parachute so that it may be attached to and carried by the person or article and be released when found necessary.

The invention has these and other objects, all of which will be explained in detail and more readily understood when read in conjunction with the accompanying drawings, which illustrate various arrangements whereby the invention may be accomplished, it being therefore obvious that other changes and modifications may be resorted to without departing from the spirit of the appended claims forming a part hereof.

In the drawings

Fig. 1 is a side view of an airplane having a parachute associated therewith and means for rendering the parachute ineffective for actuation by winds.

Fig. 2 is a plan view of the parachute shown in Fig. 1.

Fig. 3 is a detail view of a portion of the structure shown in Fig. 1.

Figs. 4 and 5 are plan views of a parachute having a modified structure applied thereto.

Figs. 6 and 7 are detail views of a means for securing a binder cord together and means for releasing the ends of the cord.

Fig. 8 is another modified construction.

The embodiment of the invention shown in Fig. 1 is illustrated as attached to an airplane 10. This construction of the invention contemplates providing the buoy or body portion 11 with a plurality of radially arranged members 12 which project from the edge 13 of the parachute and are each provided with a part providing an eyelet 14, through each of which one end of a draw cord or rope 15 is passed. The opposite end of said cord or rope is provided with a loop 16 through which said first mentioned end is also passed. The termination 17 of the draw cord or rope may be secured to a windlass 18 secured to the airplane, in which airplane the parachute may be housed and from which it may be released.

This arrangement just described is designed to provide means for drawing the edge of the body portion 11 together to thus contract the body portion, as it is evident that as the draw cord or rope is wound upon the windlass, the draw cord will slide relatively to the eyelets 14 and loop 16 and cause the edge 13 of the body portion to be drawn together so that wind or other pressure will be prevented from acting upon the parachute to cause the distention of the parachute, which will thus render the parachute ineffective to drag the person or plane, and thus prevent injury to the person or plane to which the parachute is attached. The supporting cords or cables 19 of the parachute may, if so desired, be secured to the body portion of the parachute by having the draw cord or rope passed through loops 20 provided in the ends of said cables 19.

The above structure shown in Fig. 4 contemplates a construction in which a portion of the body of the buoy may be released from another portion thereof to thereby reduce the area of the portion which forms the buoy. In this structure the parachute is composed of two portions 21 and 22. The outer portion 21 has supports such as 19 of Fig. 1 secured in the ordinary manner to the outer edge thereof, the inner portion 22 being designed to be released from the outer portion and thus reduce the area against which the wind may act. These sections 21 and 22 are each provided with eyelets, respectively designated 23 and 24, which are arranged relatively to each other so as to receive the binder cord 25. The opposite ends of the binder cord 25 are releasably secured together so that when these ends are separated, the inner section 22 may be freed from the outer section.

One method of releasably securing the ends of the binder cord 25 together is shown in Figs. 6 and 7, which contemplates binding the opposite ends of said cord together by means of a strip of tape 26 and securing a piece of wire 27 to one of said ends and arranging a portion of said wire between the ends of the cord and the tape with a suitable length of the wire extended beyond the taped portion. A pull cord 28 is attached to this last mentioned portion of the piano wire, it being understood that the pull cord extends to a location where it is accessible to the user of the parachute. When it is desired to release the inner section 22 from the outer portion of this structure a pull upon the pull cord 28 will cause the wire 27 to sever the tape 26 and free the ends of the binder cord which, when separated, allows the release of the inner section 22 from the outer section 21, which reduces the resistance offered to the wind and thus will prevent the person or article from being dragged or upset after landing.

The device shown in Fig. 5 contemplates forming the body portion of the parachute of two separable halves 29 and 30 which are secured together by binder cords 31 and 32 and eyelets, respectively designated 33 and 34, provided along the edges of each half. In this construction the outer end of each cord is fastened to one of the parachute halves and the inner ends are secured with each other, as shown at 35, by means of tape which is severed to allow the release of the cords as previously described.

In the structure shown in Fig. 8 a pull cord 36 is secured to the center of the parachute body 37. This cord is attached to a windlass, such as previously described with reference to Fig. 1, and is employed to draw the body of the parachute to the position shown in dotted lines in Fig. 8, which will also prevent the parachute and the wind, cooperating with each other, to upset and drag the article or person along the ground.

From the foregoing description it is manifest that a simple means is provided whereby a parachute may be rendered ineffective for actuation by winds to drag a person or article along the ground after landing.

Having thus described my invention what I claim and desire to cover by Letters Patent is:

1. A parachute having means for rendering said parachute ineffective for operation by air pressure, said means including detachably connected body portions and means for controlling said first mentioned means, said last mentioned means including a pull cord.

2. A parachute having means for rendering said parachute ineffective for operation by air pressure, said means including detachable connected body portions which are severable from each other for reducing the effective area of the body portion of said parachute.

3. A parachute having means for rendering said parachute ineffective for operation by air pressure, said means including detachable connected body portions which are severable from each other for reducing the effective area of the body portion of said parachute, and means for controlling the separation of said body portions.

4. A parachute having means for rendering said parachute ineffective for operation by air pressure, said means including detachable connected body portions which are severable from each other for reducing the effective area of the body portion of said parachute, means for controlling the separation of said body portions, and means for severing said controlling means to allow one of said body portions to be severed from the other.

5. A parachute comprised of a member having supporting cables extending from the periphery thereof, said member having an opening at the center thereof, a member closing said opening, means forming a releasable connection between the periphery of said member forming said closure and the edge of said opening to thereby allow said closure member to be released from said first mentioned member to thereby reduce the effective area of said parachute.

In witness whereof, I hereunto subscribe my name this 7th day of December, A. D. 1928.

LOUIS S. ROCKOFF.